(12) United States Patent
Dieterle et al.

(10) Patent No.: US 6,703,800 B2
(45) Date of Patent: Mar. 9, 2004

(54) CIRCUIT FOR GENERATING A DYNAMIC FOCUSING VOLTAGE FOR A PICTURE TUBE

(75) Inventors: Franz Dieterle, Schiltach (DE); Michael Loesle, Villingen-Schwenningen (DE); Martin Läufer, Villingen-Schwenningen (DE)

(73) Assignee: Thomson Licensing SA, Boulogne-Billancourt (FR)

( * ) Notice: Subject to any disclaimer, the term of this patent is extended or adjusted under 35 U.S.C. 154(b) by 0 days.

(21) Appl. No.: 10/296,454

(22) PCT Filed: May 18, 2001

(86) PCT No.: PCT/EP01/05722
§ 371 (c)(1),
(2), (4) Date: Nov. 25, 2002

(87) PCT Pub. No.: WO01/93567
PCT Pub. Date: Dec. 6, 2001

(65) Prior Publication Data
US 2003/0133052 A1 Jul. 17, 2003

(30) Foreign Application Priority Data
May 31, 2000 (DE) .......................... 100 26 986

(51) Int. Cl.$^7$ ................................ H01J 29/58
(52) U.S. Cl. ................... 315/382; 315/382.1
(58) Field of Search ............... 315/382, 382.1

(56) References Cited
U.S. PATENT DOCUMENTS 5,043,638 A  *  8/1991  Yamashita .............. 315/382.1
5,565,746 A  * 10/1996  George ...................... 315/382

FOREIGN PATENT DOCUMENTS

DE       41 30 581      3/1993
JP        07058975      3/1995
JP      2000115572      4/2000

* cited by examiner

Primary Examiner—David Vu
(74) Attorney, Agent, or Firm—Joseph S. Tripoli; Harvey D. Fried; Sammy S. Henig

(57) ABSTRACT

In a television receiver, a dynamic, parabolic correction voltage for focusing is generated by way of a transformer whose primary winding is fed with the line deflection current or a line-frequency voltage and to whose secondary winding a capacitor is connected, which capacitor integrates the sawtooth-waveform current in the secondary winding into a parabolic voltage. New types of picture tubes require a correction voltage which does not have a parabolic profile, rather whose form corresponds approximately to the cross section through the center of a bathtub. It is an object to provide a simple circuit for generating such a bathtub-waveform correction voltage. This is achieved by virtue of the fact that a frequency-dependent network, in particular a series resonant circuit comprising an inductance and a capacitance, is connected in parallel with the capacitor, which network is tuned in such a way that the network effects an additional sinusoidal current with a period duration approximately equal to the line trace period. The circuit is particularly simple, requires no active elements, effects a low power loss, can be used with a current transformer and furthermore enables blanking of the correction voltage during the vertical blanking interval.

8 Claims, 2 Drawing Sheets

CIRCUIT FOR GENERATING A DYNAMIC FOCUSING VOLTAGE FOR A PICTURE TUBE

Figure 1:
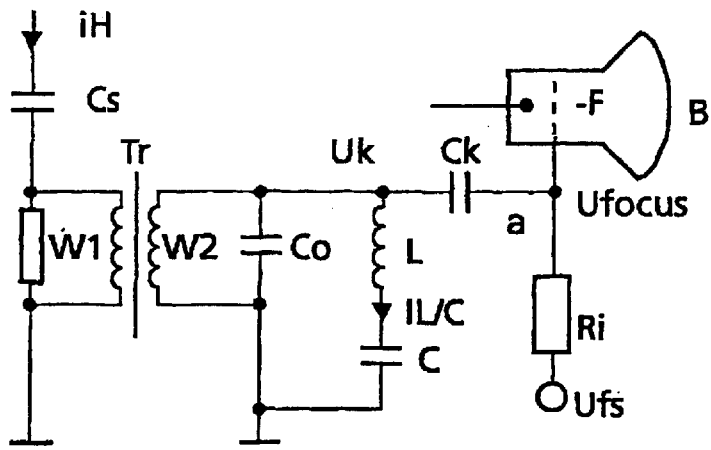

This application claims the benefit under 35 U.S.C. § 365 of International Application PCT/EP01/05722, filed May 18, 2001, which claims the benefit of German Patent Application No. 100 26 986.9 filed May 31, 2000.

The invention is based on a circuit for generating a dynamic focusing voltage for a picture tube in accordance with the preamble of claim 1. A circuit of this type is disclosed by WO 93/06688.

In a television receiver, a high focusing DC voltage of the magnitude of 7 kV is applied to the focusing electrode of the picture tube, which voltage effects extensive focusing of the luminous spot generated by the electron beam on the screen over the entire screen area.

In new types of cathode ray tubes having larger deflection angles or screens, the change in the value—required for optimum focusing—of the focusing voltage in the horizontal direction and in the vertical direction over the screen area is so large that adequate focusing over the entire screen area is not possible with a fixed focusing DC voltage. The focusing voltage must then change dynamically in accordance with the respective position of the luminous spot on the screen in the horizontal direction and in the vertical direction.

For this purpose, it is known to add a horizontal-frequency and/or vertical-frequency dynamic correction voltage via AC voltage coupling to the static focusing DC voltage. The focusing voltage effective on the focusing electrode then comprises a high DC voltage component and an AC voltage component in the form of the abovementioned dynamic focusing voltage. Good matching of the respective focusing voltage to the optimum values for focusing can be achieved with a parabolic correction voltage in the horizontal direction and in the vertical direction.

For the circuit for generating a line-frequency, parabolic correction voltage, there are, in principle, three different circuit types:

In the case of a first circuit type, the primary winding of the transformer operating as a current transformer is connected in series with the deflection current, in particular in series with the deflection coil and the so-called S capacitor or tangent capacitor. A sawtooth-waveform current flows in the secondary winding on account of the sawtooth-waveform deflection current in the primary winding, and is integrated into a parabolic voltage by the capacitor.

In the case of a second circuit type, the transformer serves as a voltage transformer, the voltage across the S capacitor or so-called tangent capacitor being fed to the primary winding.

In the case of a third circuit type, described in WO 93/06688, the primary winding of the transformer is fed with the line flyback pulse, and the transformer is deliberately designed with loose coupling between primary winding and secondary winding. This loose coupling has the following purpose: in order to convert the flyback pulse into a parabolic voltage, the flyback pulse has to be integrated twice. The first integration converts the flyback pulse into a sawtooth-waveform current, while the second integration integrates the sawtooth-waveform current into the parabolic voltage. In this case, the inductance required for the first integration in the series path is formed by the deliberately increased leakage inductance of the transformer.

In the very latest picture tubes, which operate for example with a so-called Eureka gun, also called MR gun, adequate focusing can no longer be achieved with a parabolic correction voltage. It has been shown that, on account of the special gun optical system and the large radius of curvature of the screen of these tubes, a correction voltage which is less pointed and wider at the vertex than a parabola is advantageous. This new form of correction voltage approximately corresponds to the cross section through the centre of a commercially available bathtub and is therefore designated hereinafter by bathtub-waveform correction voltage. A correction voltage of this type can no longer be generated by simple integration of a sawtooth-waveform current.

It is desirable, therefore, to provide a simple circuit with which the abovementioned bathtub-waveform horizontal-frequency correction voltage can be generated from a line-frequency current or a line-frequency voltage. The invention specified in claim 1 is suitable for this purpose. Advantageous embodiments and developments of the invention are specified in the subclaims.

The invention can be applied to the first and third circuit types described. In the case of the invention, in order to generate the bathtub-waveform correction voltage, a frequency-dependent network is provided in parallel with the capacitor across the secondary winding of the transformer supplying the correction voltage, which network is tuned in such a way that it effects an additional sinusoidal current with a period duration approximately equal to the line trace period.

The circuit according to the invention is based on the following effect. The secondary winding of the transformer acts as a current source which effects a sawtooth-waveform current in the combination comprising the capacitor and the abovementioned network. The resulting current in the capacitor is the difference between the sawtooth-waveform current from the secondary winding and the network. The integration of the current by the capacitor produces a voltage having the desired bathtub-waveform profile.

The invention has a number of advantages. The circuit is particularly simple since, for example in a preferred embodiment, it only requires two passive components in the form of a capacitor and a coil, and no active elements. As a result, the power loss is also minimized. The invention is particularly suitable for converting, in a simple manner, a known circuit for generating a parabolic correction voltage of the abovementioned first and third circuit types into a circuit for generating a bathtub-waveform correction voltage. Moreover, the circuit according to the invention does not require additional adjustment of components. Furthermore, in the case of the third circuit type described, the circuit makes it possible, in a simple manner, to effect blanking of the correction voltage during the vertical blanking interval.

The period duration of the resonant frequency of the network need not correspond exactly to the line trace period, but rather may, in particular, be somewhat longer than the line trace period. The respectively required form of the correction voltage can be achieved by corresponding dimensioning of the impedance of the network whilst adhering to the abovementioned tuning. In the case of a network in the form of an L/C series resonant circuit, smaller values for the capacitance and higher values for the conductance of the series circuit reduce the current in the series circuit and give the correction voltage generated a more parabolic profile. The maximum curve shaping in the direction of the bathtub shape is achieved if the peak value of the sinusoidal current in the series circuit reaches half the peak value of the current supplied by the secondary winding. Higher peak currents in the series circuit can lead to visibility of the oscillation frequency in the correction voltage on the screen. The respectively required amplitude of the correction voltage can be set by means of the turns ratio and, in the case of the third circuit type, by means of the air gap of the transformer.

In the dimensioning of the circuit according to the invention, under certain conditions the following difficulty may arise: in order to generate a dynamic correction voltage with an amplitude in the region of 1 kV, the capacitor connected in parallel with the secondary winding must have a value of the order of magnitude of a few hundred pF in the case of the abovementioned first and third circuit types, because only a small current having a peak value of about 10 mA flows in the secondary winding. Since the current in the LC series circuit must be less than or equal to half the sawtooth current, the result is a low capacitance of less than 500 pF for the capacitor and a relatively high value of more than 20 mH for the inductance. Such a high inductance is difficult to realize in practice. In order to eliminate this difficulty, in accordance with one development of the invention, the transformer is provided with a third winding, and the network, in particular the L/C series resonant circuit, is connected in parallel with this third winding. The third winding is preferably fixedly coupled to the secondary winding. Given a turns ratio of the secondary winding to the third winding of the order of magnitude of 6, in the case of a short circuit, the current in this third winding is six times higher than the current in the secondary winding W2, and the transformed capacitance of the capacitor across the third winding W3 is six times greater than the capacitance of the capacitor itself. With the low output impedance of the third winding, the embodiment of a corresponding L/C series resonant circuit is significantly simpler. For deflection at twice the line frequency, so-called 2H deflection, values of 6 nF for C and 2 mH for L can be used for the L/C series resonant circuit. This development of the invention can also advantageously be applied to the abovementioned third circuit type.

The function of the circuit—disclosed in WO 9306688—for blanking the correction voltage during the vertical flyback period is not adversely affected by the additional L/C resonant circuit according to the invention.

Figure 2:
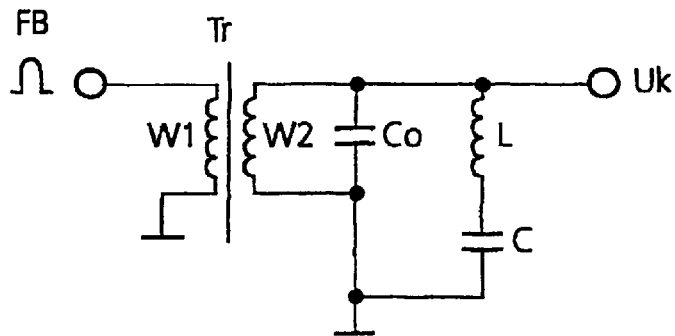
Figure 3:
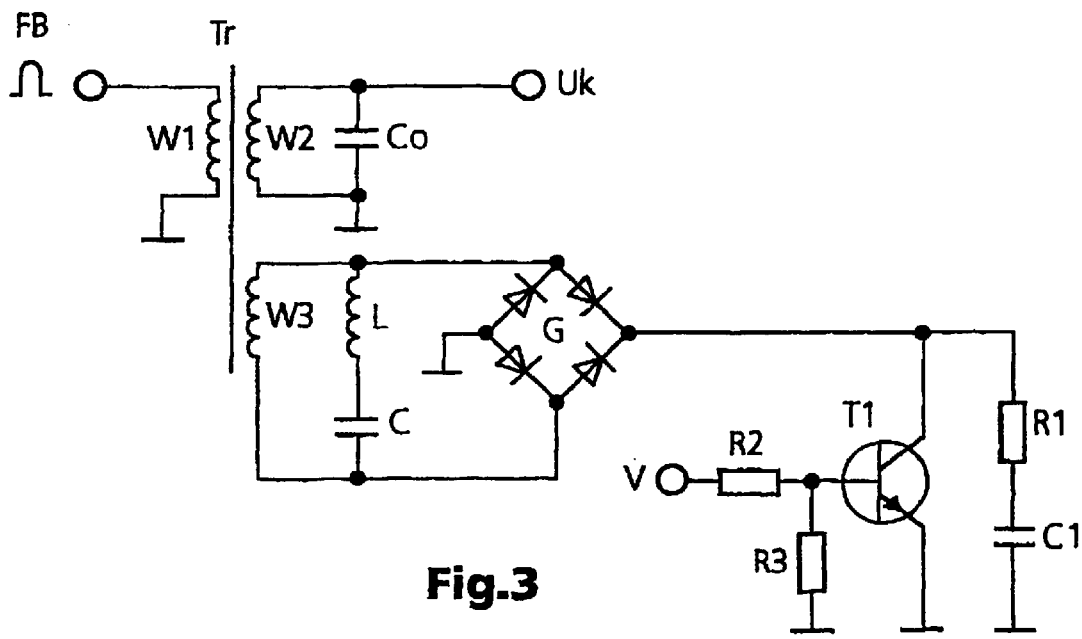
Figure 4:
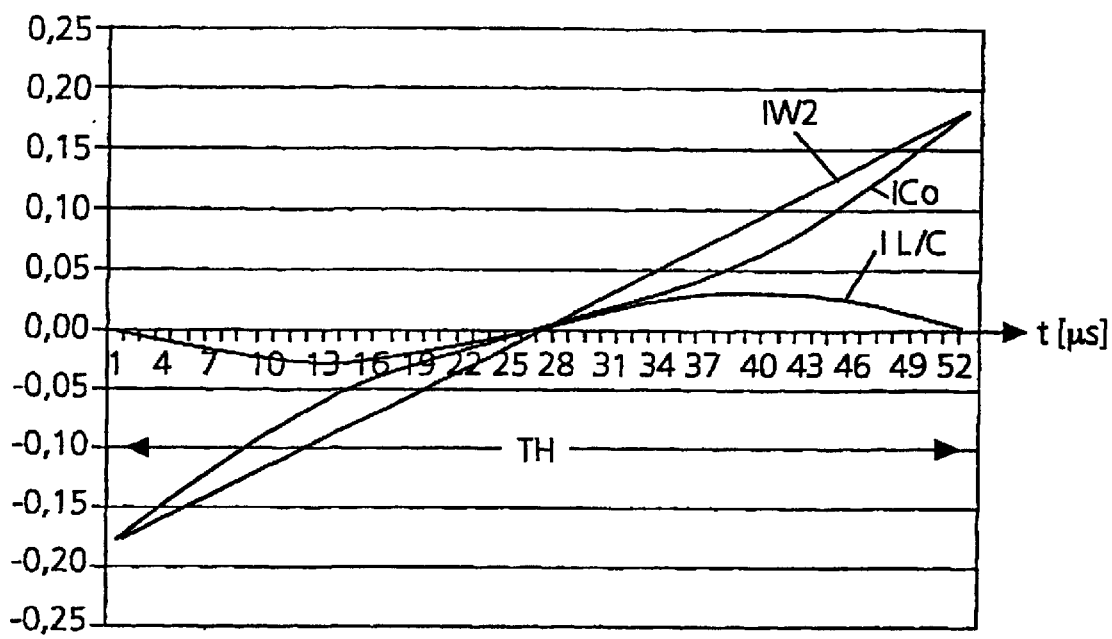
Figure 5:
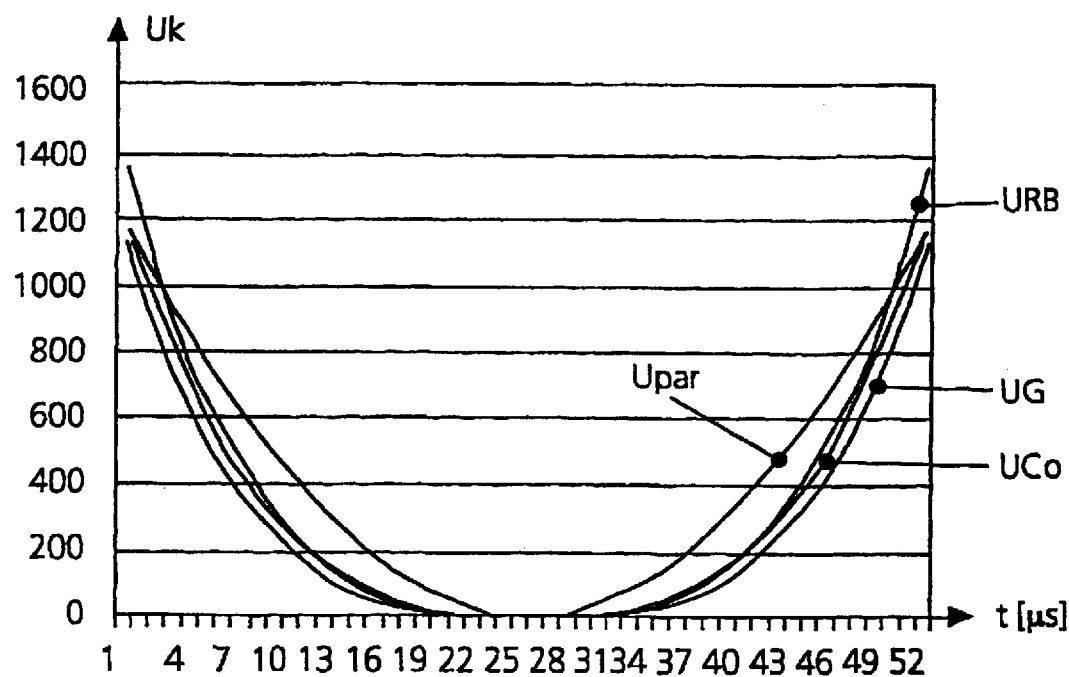

The invention is explained below with reference to the drawing using a plurality of exemplary embodiments. In the drawing:

FIG. 1 shows an exemplary embodiment of the invention for the abovementioned first circuit type with a current transformer, FIG. 2 shows an exemplary embodiment for the abovementioned third circuit type, FIG. 3 shows a development of the circuit as shown in FIG. 2 for additional blanking of the correction voltage during the vertical flyback period, FIG. 4 shows curved profiles for currents and voltages in the circuits illustrated, and FIG. 5 shows various empirically determined and calculated profiles of correction voltages.

FIG. 1 shows part of a line deflection circuit for a picture tube B in a television receiver. The S-shaping or tangent capacitor Cs and the primary winding W1 of a current transformer Tr lie in the path of the line deflection current iH which flows through the horizontal deflection coil of the picture tube B. A capacitor Co (Co=Output) is connected in parallel with the secondary winding W2 of the transformer Tr, the series circuit comprising an inductance L and a capacitance C being connected in parallel with the said capacitor. The line deflection current iH initially generates a sawtooth-waveform current in the secondary winding W2, this sawtooth-waveform current being integrated into a parabolic voltage by the capacitor Co. The resonant frequency of the series resonant circuit L/C is tuned to the line trace period of 52 μs. The series resonant circuit L/C generates an additional sinusoidal current in the capacitor Co, which current converts the inherently parabolic voltage across Co into a bathtub-waveform correction voltage Uk. This correction voltage Uk is fed to the circuit point a via AC voltage coupling with the coupling capacitor Ck, and, at the said circuit point a, is combined with the static focusing DC voltage Ufs and fed as total focusing voltage Ufocus to the focusing electrode F of the picture tube B. Ri designates the internal resistance of the source for Ufs. The period duration of the resonant frequency of the series resonant circuit L/C may also be somewhat longer than the line trace period.

FIG. 2 shows an embodiment for the abovementioned third circuit type. In this case, the transformer Tr acts as a current transformer, the line flyback pulse FB being fed to the primary winding W1. The transformer Tr has particularly loose coupling between the primary winding W1 and the secondary winding W2, with the result that a relatively large leakage inductance takes effect, which is connected in series with the windings W1 and W2 in the equivalent circuit diagram. This leakage inductance is utilized such that a double integration takes place. The first integration integrates the flyback pulse FB into a sawtooth-waveform current, and the second integration converts the sawtooth-waveform current in the secondary winding W2 into a parabolic voltage. From the latter, as in FIG. 1, the series resonant circuit L/C then generates the bathtub-waveform correction voltage Uk, since the entire sawtooth-waveform current from W2 does not flow through the capacitor Co, but rather only its difference with respect to the sinusoidal current in L/C.

FIG. 3 shows an exemplary embodiment for a development of the invention with additional blanking of the correction voltage Uk during the vertical blanking interval, which likewise operates in accordance with the third circuit type or FIG. 2. The voltage transformer Tr contains a third winding W3, and the series resonant circuit L/C is connected in parallel with this third winding W3. The turns ratio W2/W3 is of the order of magnitude of 6 and may also be 5 or 7. First of all, this solution avoids the difficulty described in the introduction in the case of the dimensioning of the series resonant circuit L/C. Connected in parallel with the third winding W3 is a bridge rectifier G, to whose output a transistor T1 is connected. Connected in parallel with the collector/emitter path of the transistor T1 is a charging capacitor C1 with current limiting R1, and a vertical blanking pulse V is fed via the voltage divider R2/R3 to the base of the transistor T1. During the vertical trace period, the transistor T1 is turned off, the rectifier G is not loaded, and the circuit operates in a similar manner to that in FIG. 2. During the vertical blanking interval, the transistor T1 is turned on by the vertical blanking pulse V. The rectifier G is short-circuited, with the result that the winding W3 is likewise short-circuited and the correction voltage Uk is blanked. The blanking of the correction voltage Uk during the vertical blanking interval is necessary for the following reason: the high AC voltage in the form of the correction voltage Uk on the focusing electrode F of the picture tube B produces capacitive feedback to the cathodes and the grid 2 of the picture tube B. This influences the so-called cut-off measuring, that is to say the measurement of the beam current for the black value, of the three guns of the picture tube B, which can lead to changes in the colour temperature and to disturbances in the cut-off control.

FIG. 4 shows, for the line trace period TH of 52 μs, the sawtooth-waveform current IW2 through the secondary winding W2, the sinusoidal current IL/C through the series resonant circuit L/C and the current Ico—effected thereby—with the period of the line trace period TH through the capacitor Co. This current generates the required bathtub-waveform correction voltage at Co in the manner described. The current waveforms illustrated relate to the embodiments shown in FIG. 1 and FIG. 2. IW2 and Ico are identical in the case of the embodiment according to FIG. 3.

FIG. 5 shows various required and calculated profiles of the bathtub-waveform correction voltage Uk in comparison with a parabolic correction voltage Upar. Uco designates the voltage across the capacitor Co, UG designates the required correction voltage for the colour green and the curve URB designates the required correction voltage for the colours red and blue. The last voltages are approximately identical owing to the symmetrical position of the electron guns for red and blue relative to the centre, while the correction voltage UG deviates therefrom owing to the position of the electron gun for green in the centre of the inline arrangement of the three guns. In practice, only a correction voltage which approximately corresponds to the average profile of the curves UG and URB is used.

List of Reference Symbols a Circuit point
B Picture tube
C Capacitor
C1 Capacitor
Ck Coupling capacitor
Co Capacitor
Cs Tangent capacitor
FB Line flyback pulse
G Bridge rectifier
Ico Current
IL/C Current
IW2 Current
L Coil
R1 Resistor
R2 Resistor
R3 Resistor
Ri Internal resistor
T1 Transistor
TH Line trace period
Tr Transformer
Uco Voltage
Ufocus Focusing voltage
Ufs Static focusing voltage
UG Voltage
Uk Correction voltage
Upar Correction voltage
URB Voltage
W1 Primary winding
W2 Secondary winding
W3 Third winding

What is claimed is:

1. Circuit for generating a dynamic focusing voltage for a picture tube by means of a transformer, to whose primary winding a line-frequency current or a line-frequency voltage is fed and with whose secondary winding a capacitor is connected in parallel, wherein, in order to generate a bathtub-waveform correction voltage deviating from the parabolic form, a frequency-dependent network is connected in parallel with the capacitor, the network being tuned in such a way that the network effects an additional sinusoidal current with a period duration approximately equal to the line trace period.

2. Circuit according to claim 1, wherein the period duration of the sinusoidal current is somewhat longer than the line trace period.

3. Circuit according to claim 1, wherein the network is formed by a series circuit comprising an inductance and a capacitance.

4. Circuit according to claim 1, wherein the required form of the correction voltage is set by the impedance of the network.

5. Circuit according to claim 1, wherein the required amplitude of the required correction voltage is set by the turns ratio and/or the air gap of the transformer.

6. Circuit according to claim 1, wherein the transformer has a third winding and the network is connected in parallel with this third winding.

7. Circuit according to claim 6, wherein the third winding is fixedly coupled to the secondary winding.

8. Circuit according to claim 7, wherein the turns ratio of the secondary winding to the third winding is of the order of magnitude of 6.

* * * * *